(12) United States Patent
Oates et al.

(10) Patent No.: US 6,755,905 B2
(45) Date of Patent: Jun. 29, 2004

(54) USE OF HIGH CARBON COAL ASH

(75) Inventors: David Bridson Oates, Kettleby (CA); John Graham Whellock, Castle Rock, CO (US); Philip Souza Zacarias, Mississauga (CA)

(73) Assignee: Lafarge Canada Inc., Quebec (CA)

( * ) Notice: Subject to any disclaimer, the term of this patent is extended or adjusted under 35 U.S.C. 154(b) by 199 days.

(21) Appl. No.: 10/078,235

(22) Filed: Feb. 15, 2002

(65) Prior Publication Data

US 2003/0154887 A1 Aug. 21, 2003

(51) Int. Cl.[7] .................................................. C04B 7/14
(52) U.S. Cl. ...................... 106/705; 106/707; 106/789; 106/790; 106/791
(58) Field of Search ................ 106/705, 707, 106/789, 790, 791

(56) References Cited

U.S. PATENT DOCUMENTS

| | | | |
|---|---|---|---|
| 4,174,974 A | | 11/1979 | Fondreist |
| 4,341,562 A | * | 7/1982 | Ahlbeck ................ 106/DIG. 1 |
| 4,617,045 A | * | 10/1986 | Bronshtein ...................... 65/27 |
| 4,971,627 A | | 11/1990 | Koslowski et al. |
| 5,430,236 A | * | 7/1995 | de Macedo ................. 405/128 |
| 5,498,277 A | | 3/1996 | Floyd et al. |
| 5,521,132 A | | 5/1996 | Talmy et al. |
| 5,558,690 A | * | 9/1996 | Hnat et al. ....................... 65/19 |
| 6,066,771 A | | 5/2000 | Floyd et al. |
| 6,287,363 B1 | | 9/2001 | Grunbacher et al. |

FOREIGN PATENT DOCUMENTS

| | | |
|---|---|---|
| DD | 241 085 | 11/1986 |
| DE | 26 49 362 | 5/1978 |
| EP | 0 847 966 | 6/1998 |
| JP | 10281442 | * 10/1998 |
| WO | WO 00/00447 | 1/2000 |

OTHER PUBLICATIONS

"Vitrification process for treatment of sewage sludge and incineration ash", Kikuchi Journal of the Air and Waste Mgmt Assoc. (1998), 48(11), pp. 1112–1115. Abstract Only.*

"Hydraulic activity of slags obtained by vitrification of wastes":, Pera et al. ACI Materials Journal (1996), 93(6), pp. 613–618 Abstract Only.*

JP 61048475 (Mar. 10, 1986), Abstract, Nippon Jiryoku Senko KK.

PCA R&D Serial No. 2036b, Development of Manufactured Supplementary Cementitious Material for CKD Utilization by Alex Mishulovich, Portland Cement Association 1999.

* cited by examiner

Primary Examiner—Paul Marcantoni
(74) Attorney, Agent, or Firm—Bachman & LaPointe, P.C.

(57) ABSTRACT

A synthetic slag is produced by a high temperature combustion reaction between coal ash having a high carbon content, and a source of lime such as cement kiln dust. The carbon content of the coal ash is oxidized by oxygen gas, which typically is derived from air or an air/oxygen combination in an exothermic reaction and the heat generated is exploited in the melting process. In this way the gaseous products will typically comprise nitrogen, unreacted oxygen and carbon dioxide, and heat energy can be readily recovered from the hot off gas products evolving during the combustion reaction. The synthetic slag may be pelletized and employed as lightweight mineral aggregate or milled to cement fineness to provide slag cement.

22 Claims, 2 Drawing Sheets

USE OF HIGH CARBON COAL ASH

BACKGROUND OF THE INVENTION i) Field of the Invention

This invention relates to a method of producing a value product from a source of lime, which may be an industrial inorganic byproduct such as cement kiln dust and a coal ash of high carbon content which is an industrial inorganic byproduct.

The method exploits heat generated from combustion of the carbon content of the coal ash and hot combustion gases evolved also provide a source of heat energy which can be recovered.

ii) Description of Prior Art

Coal ashes, namely bottom ash and fly ash are produced as byproducts in the burning of coal and are collected in industrial installations in a particulate form for disposal. Fly ash is produced in a fine particle form.

Coal ashes are pozzolanic and are employed as supplementary materials in cements, however, a significant carbon content in coal ashes limits their use in cements in the absence of steps to remove the carbon from the coal ash.

In the case of coal ashes having a carbon content above about 3%, by weight, methods have been developed which can remove the carbon so that the coal ash can be employed as a cement supplement. The methods include separation systems which produce a waste stream of mixed ash and carbon as well as a low carbon ash stream; and combustion of the carbon producing an ash stream and heat which may not be usable. These methods are not as practicable or economical for high carbon coal ashes having a carbon content above about 10%, by weight.

Thus, coal ashes of high carbon content can not be employed as supplementary cement material, and represent a disposal problem.

Cement kiln dust is a byproduct of cement processing and is produced in fine particulate form and is composed of partly and fully calcined calcium carbonate, thus it comprises calcium carbonate and calcium oxide (lime).

Cement plants may produce cement kiln dust (CKD) in differing quantities, even as high as 200,000 tons of cement kiln dust annually, and the CKD represents a disposal problem.

Cement kiln dust has been employed in cement production, but its fineness represents a handling problem and its use limited by chemistry.

Blast furnace slag is a significant supplementary cement material, however, manufacture of such cement material is limited to slag supplied by iron blast furnaces having slag quenching facilities.

SUMMARY OF THE INVENTION

It is an object of this invention to produce a synthetic slag comparable to blast furnace slag and which can be employed as a supplementary cement material, or lightweight aggregate.

It is a further object of this invention to produce such a synthetic slag employing a source of lime, which may be, for example, cement kiln dust; and coal ash of high carbon content.

It is still a further object of this invention to provide a method for producing such a synthetic slag, which exploits heat of combustion of the high carbon content of coal ash.

It is yet a further object of this invention to provide such a method with removal of hot combustion gases and recovery of the heat energy of such gases.

In accordance with the invention there is provided a method of producing a value product from a source of lime and coal ash comprising: a) establishing an initial melt of an inorganic material providing a source of lime and a coal ash having a high carbon content, b) adding fresh amounts of said inorganic material and said coal ash to said initial melt, c) oxidising the carbon content of said coal ash in said melt with generation of heat, and exploiting the generated heat in the melting of said fresh amounts to produce an enlarged melt of molten calcium aluminosilicate material, and d) recovering a value product from said enlarged melt.

DESCRIPTION OF PREFERRED EMBODIMENTS

Figure 1:
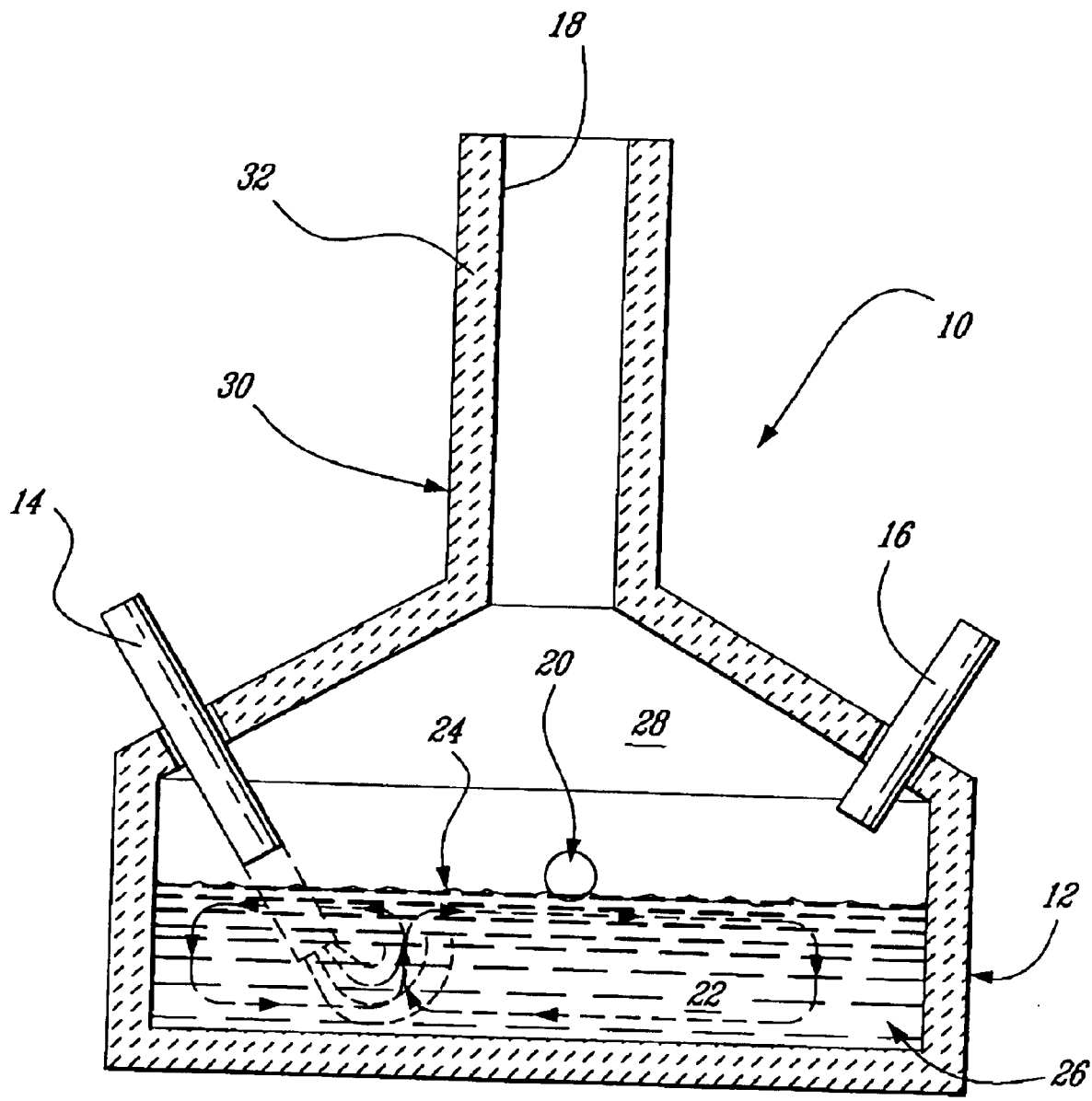
FIG. 1 illustrates schematically a combustion furnace for carrying out the method of the invention, in one embodiment.

The method of the invention produces a value product from inorganic materials including inorganic material which is a byproduct of industrial manufacture and which represents a disposal problem.

In particular, the method employs a coal ash having a high carbon content and which represents a significant disposal problem; and a source of lime. The source of lime is in particular cement kiln dust which is a byproduct of cement production, however, other sources of lime may be employed including limestone, calcined lime, dolomite, calcite or other forms of calcium carbonate and lime (quick lime) itself or calcium hydroxide (slaked lime) or combinations thereof.

The melt may be supplemented by auxiliary materials which introduce the elements Ca, Si and Al into the melt, for example, calcium silicate, calcium aluminate and calcium aluminosilicate, air cooled blast furnace slags and materials such as steel slags which introduce other elements such as Mg; further examples of auxiliary materials to introduce Mg are magnesium oxide, hydroxide or carbonate.

i) Coal Ash

The coal ash as employed in this invention refers to the residue produced in power plant boilers or coal burning furnaces, for example, chain grate boilers, cyclone boilers and fluidized bed boilers, from burning pulverized anthracite or lignite, or bituminous or sub-bituminous coal. Such coal ash includes fly ash which is the finely divided coal ash carried from the furnace by exhaust or flue gases; and bottom ash which collects at the base of the furnace as agglomerates; the size of the ash particles is not of importance.

The fly ash employed in the invention may be a Type F or Type C fly ash contaminated with carbon or bottom ash similarly contaminated with carbon, such as results from the employment of low $NO_x$ burners to reduce oxides of nitrogen in coal burning power plants, or from uneven firing of coal fired burners generally; or from the addition of low levels of petroleum coke to lignite, sub-bituminous or bituminous coal.

a) Flyash

The Type F and Type C flyashes referred to above are defined by CSA Standard A23.5 and ASTM C618, both incorporated herein by reference, and these same flyashes having a higher LOI% or higher carbon content than that specified by the standards.

The fly ash may contain 3 to 30%, more usually 5 to 20%, by weight, of carbon, an amount which would be disadvantageous if the flyash were employed in an amount of 2 to 40%, or more usually 5 to 25%, by weight, as an addition to cement clinker.

In general it is preferred to avoid the presence of carbon in fly ash which is to replace a portion of cement; when carbon is present it is more difficult to control the characteristics of the cement and concrete.

Typically a majority of the flyash, at least about 80%, by weight, comprises particles of less than 45 microns.

b) Bottom Ash

Bottom ash is formed as agglomerates in coal combustion boilers from the combustion of coal. Such combustion boilers may be wet bottom boilers or dry bottom boilers.

When produced in a wet or dry bottom boiler, the bottom ash is quenched in water. The quenching results in agglomerates typically having a size in which 90% fall within the particle size range of 0.1 mm to 20 mm; in general the bottom ash agglomerates have a wide distribution of agglomerate size within this range.

The main chemical components of a bottom ash are silica and alumina with lesser amounts of oxides of Fe, Ca, Mg, Mn, Na and K, as well as sulphur and carbon. The bottom ash may also have hydraulic properties; this depends on the chemistry of the coal, especially the calcium content.

ii) Cement Kiln Dust

Cement kiln dust is produced in a cement kiln as a byproduct in the manufacture of cement.

Cement kiln dust is composed of fine particles typically having a particle size of 100% passing 300 microns and 50% passing 20 microns.

Table 1 below, sets out a typical chemical composition of cement kiln dust.

The oxidation of the carbon forms carbon dioxide and possibly carbon monoxide but the latter is further oxidized to carbon dioxide; oxygen is typically supplied in an excess of that required for combustion of the carbon and thereby ensures oxidation of any carbon monoxide to dioxide.

The method may be carried out on a continuous basis or on a semi-continuous or continual or batchwise basis.

The relative amounts of the coal ash and the source of lime considered on the basis of $SiO_2$ and $Al_2O_3$ relative to CaO, as a mole ratio, will typically be 1 to 2.5:1 to provide a synthetic slag of calcium aluminosilicate in accordance with the invention.

| $SiO_2$ | $Al_2O_3$ | $TiO_2$ | $P_2O_5$ | $Fe_2O_3$ | CaO | MgO | $Mn_2O_3$ | $Na_2O$ |
|---|---|---|---|---|---|---|---|---|
| 25 | 10 | 0 | 0 | 0 | 15 | 0 | 0 | 0 |
| 55 | 30 | 2 | 1.0 | 15 | 60 | 20 | 2 | 10 |

At the start-up supplementary heat may be required for the melting to establish an initial melt of a charge of cement kiln dust and fly ash, thereafter the heat for reaction and melting of fresh charges of cement kiln dust and fly ash added to the melt may be generated in situ by the oxidation of the carbon content of the fly ash.

It is within the scope of the invention for the aforementioned generated heat to provide the primary heat for the melting process, and for supplementary or secondary heat to be provided by addition of carbonaceous material to the melt.

Whether or not supplementary heat is necessary will depend on the level of carbon content in the flyash, and the relative amounts of cement kiln dust and flyash employed in a particular operation. The latter may depend, in part, on the relative abundance of the cement kiln dust and the high carbon flyash at the site where the method is carried out.

The need for supplementary heat is also a function of the ultimate melting point of the slag system, the higher the

TABLE 1

| | Chemistry % | | | | | | | | | |
|---|---|---|---|---|---|---|---|---|---|---|
| Material | $SiO_2$ | $Al_2O_3$ | $Fe_2O_3$ | CaO | $SO_3$ | MgO | $Na_2O$ | $K_2O$ | $TiO_2$ | LOI |
| CKD | 0–25 | 0–10 | 0–5 | 20–60 | 0–20 | 0–5 | 0–2 | 0–10 | 0–1 | 5–30 |

LOI = Loss of Ignition iii) Melting Method

The method will be more particularly described by reference to the preferred embodiment in which the source of lime is cement kiln dust and the coal ash is fly ash of high carbon content.

The method involves the high temperature oxidation reaction of the cement kiln dust and fly ash to generate a molten calcium aluminosilicate material which may be considered a synthetic slag, since it has a chemistry which mimics that of slag from an iron blast furnace.

The reaction takes place with oxygen which may be employed as oxygen gas, air or oxygen-enriched air. Other gas mixtures which include free oxygen may also be employed provided they do not interfere with the desired reaction or are inert to such reactions.

The oxygen oxidizes the carbon content of the fly ash to oxides of carbon in an exothermic reaction and the heat generated in the exothermic reaction is exploited in the formation of the desired chemical composition of the synthetic slag produced in a molten form; the heat from the off gases can be used for electricity production or other purposes.

operating temperature employed to maintain good fluidity of the synthetic slag, the more likely the need for additional fuel separate from that developed from the carbon of the flyash. To some extent more oxygen enrichment of the oxidizing gas (air and oxygen) will enable this temperature to be met without additional fuel unless the flyash is of relatively low carbon content.

It will be understood that the high carbon fly ash may be supplemented with low carbon fly ash if there is insufficient high carbon fly ash available relative to the cement kiln dust available for the desired operation or with materials of similar chemistry such as an air cooled blast furnace slag and steel slag. Steel slags are generally not used as supplementary cements because of the presence in them of unreacted magnesium oxide and are largely waste products. Such steel slags can be used as a component of the melt in the process of the invention. The magnesium would react with other elements in the melt and become a stable component of the quenched output.

The method may be carried out in any furnace or high temperature reactor capable of maintaining a fluid melt of the cement kiln dust and fly ash and into which oxygen gas can be readily introduced for the oxidation of the carbon.

An important part of the process of the invention is the principal use of inexpensive fuel within the ingredients as opposed to expensive external fueling.

Suitable furnaces include cupolas, submerged combustion furnaces, Noranda reactors, flame reactors and flame spray reactors all of which are known in metal recovery from metal ores, or metal melting.

In general a suitable furnace provides a molten bath of the charged material, and additional charges are introduced from above the upper bath surface. Oxygen gas, for example, oxygen enriched air, is injected into the molten bath through an elongate lance or through a plurality of lances. The oxygen gas is injected at high velocity to cool the lance, or the lance may be indirectly cooled, and the injected oxygen gas agitates the melt to disperse the oxygen therein for reaction with the carbon content of the fly ash. At the same time the agitation causes splashing of the melt as a coating on the lance, which coating serves to protect the lance from the high temperature of the molten bath.

The lance or lances may terminate just above the melt or be submerged entering from the top of the vessel or through the sidewalls. Instead of a lance or in addition to the lance there may be employed tuyeres (nozzles or pipes) in the sidewalls such as are employed in Noranda reactors or converters used for smelting ores or concentrates. In certain cases porous plugs may be used to achieve a stirring effect or supply air and oxygen to the melt. By the agency of these lances or tuyeres the melt is agitated by the injected oxygen gas, and the reactants are mixed. An emulsion of bubbles of gas and liquid synthetic slag is created providing a high surface area for enhancement of the combustion and synthetic slag formation reactions. The hot gas bubbles of combustion products, principally nitrogen and carbon dioxide, generated in the bath by the exothermic reaction rise upwardly and escape from the bath upper surface; in their passage to the upper bath surface heat in the bubbles transfers to the molten bath. The off gases which escape from the bath upper surface into the zone above the bath are removed from the furnace. These off gases are hot, typically close to the temperature of the melt itself, and their heat energy may be recovered, for example, by conventional heat transfer techniques, for use in boiler heating or the like.

The recovery of heat energy represents a significant benefit of the method of the invention.

Any carbon monoxide escaping the bath will typically be oxidized to carbon dioxide by oxygen in the atmosphere of the zone above the bath, as there will generally be an excess of oxygen over that required stoichiometrically.

An advantage of exploiting the carbon content of the fly ash as the sole or primary fuel for the heat for the smelting, especially after the start up, is that carbon dioxide is the sole or primary gaseous byproduct for removal. The use of other carbonaceous materials such as coal or hydrocarbon fuels results in emission of water vapor and ash both of which then present handling and disposal problems. Generation of hot water vapor and ash also requires more complex heat recovery systems since the heat recovery results in condensation of the vapor to a hot water, and cooling of hot ash particles and their agglomeration.

The melting process typically requires a temperature of 1200° C. to 1650° C., preferably 1300° C. to 1450° C. for the melting reaction to proceed satisfactorily and result in a fluid synthetic slag with sufficient heat to flow from the furnace or reactor with ease.

As additional or fresh charge of the cement kiln dust and fly ash are introduced to the furnace the molten bath enlarges; molten material may be discharged continuously or periodically from the bath and recovered as a value product.

iv) Value Product

The molten calcium aluminosilicate or synthetic slag may be processed in different ways depending on the value product desired.

In a particular embodiment the synthetic slag is pelletized and the resulting pellets may be employed as a mineral aggregate, in concrete or the like, or the pellets may be ground to a particulate calcium aluminosilicate cement which may be employed in the same way that blast furnace slag cement is employed, alone or blended with other cements.

Pelletizing typically involves forming droplets of the molten synthetic slag and quenching the molten droplets while allowing the droplets to expand during solidification. In this way the pellets are formed as an expanded lightweight aggregate.

The pelletizing may, in particular, be achieved by feeding the molten synthetic slag onto a pelletizing wheel and continuously spraying the wheel with high volumes of water. In this way expanded pellets are formed which are lighter in weight than naturally formed mineral aggregates.

The pellets can be used directly as lightweight aggregates or can be milled or ground to cement fineness to be employed as slag cement.

Alternatively the synthetic slag may be simply quenched in water and then granulated in a granulator to provide slag cement.

Both lightweight aggregate and slag cement represent value products, which can be produced, in accordance with the invention for inorganic byproducts of industrial processes, which byproducts are produced in high volume and present a disposed and handling problem.

The heat produced from the off gases is significant as a source of heat for steam production for electricity or other purposes.

DESCRIPTION OF PREFERRED EMBODIMENT WITH REFERENCE TO DRAWING

With further reference to FIG. 1, a combustion furnace 10 has a furnace housing 12, a lance 14, an inlet 16, which may also be a lance, an exhaust gas outlet 18 and a tapping outlet 20.

A molten bath 22 having an upper bath surface 24 is formed in a lower region 26 of furnace 10. A zone 28 is defined above surface 24.

Furnace housing 12 has a furnace wall 30 and a refractory lining 32. Typically furnace wall 30 is externally cooled by means (not shown).

The method employing furnace 10 is further described by reference to the preferred embodiment employing cement kiln dust and high carbon fly ash.

An initial charge of cement kiln dust and fly ash is introduced through inlet 16 into lower region 26 of furnace 10.

Oxygen gas or air and fuel are introduced to the lower region 26 through lance 14 to produce an initial melt of the charge as molten bath 22. The flyash containing carbon to be burned together with oxygen gas, for example, air, are jetted through lance 14 into bath 22. This jetting may be above or below the melt, however, there should be sufficient jetting velocity to entrain gas bubbles in the bath 22 and stir the bath 22 as shown by the arrows. Thereafter fresh charges of the fly ash and cement kiln dust are introduced through inlet 16 or lance 14 and thereafter the oxygen gas and preferably the high carbon flyash, with or without cement kiln dust are injected into the molten bath 22 through lance 14 (shown operating just above or below surface 24) to enlarge the melt in molten bath 22. If additional flyash of low carbon content say less than 3% is to be used in the process, it may be added through inlet 16 with or without small amounts of air as necessary for its transport.

The heat for melting the fresh charges is derived from the exothermic oxidation of the carbon in the fly ash by the oxygen in the oxygen gas or air.

The oxidation of the carbon produces hot bubbles of carbon dioxide gas which rise through the molten bath 22 and escape from surface 24 into zone 28.

Heat is transferred from the hot bubbles to the molten bath as the bubbles rise.

The hot off gas in zone 28 is removed from furnace 10 through outlet 18. Any carbon monoxide escaping bath 22 is oxidized by oxygen in zone 28. The hot offgas exhausted through outlet 18 is subject to heat recovery operations, for example, in gas to air heat exchangers or waste heat boilers or, in certain circumstances, for preheating solids entering the furnace. This would include such material being fed as limestone, dolomite or lime bearing products or other feed that is not being physically injected which might effectively be preheated, whereafter the offgas can be discharged to atmosphere.

Carbon dioxide is derived from oxidation of the carbon content of the flyash and also from thermal decomposition of calcium carbonate in the cement kiln dust. As the LOI in the flyash is essentially solid phase carbon, there is no hydrogen as there would be in most coals or natural gas or oil fuels, so the main gaseous by product is carbon dioxide, apart from nitrogen which does not take part in the reaction and a small amount (the excess) oxygen.

After start up, if supplementary fuels are not employed, carbon dioxide is substantially the sole discharge gas.

The charges of fly ash and cement kiln dust are in proportions so that the melt produces a synthetic slag of calcium aluminosilicate.

The synthetic slag is discharged from outlet 20 and typically is subjected to pelletizing to produce pellets which may be employed as mineral aggregate or milled or ground to slag cement fineness.

Oxygen gas or air is injected to provide a stoichiometric excess for oxidation of the carbon content of the fly ash, to ensure that all of the carbon is oxidized.

Figure 2:
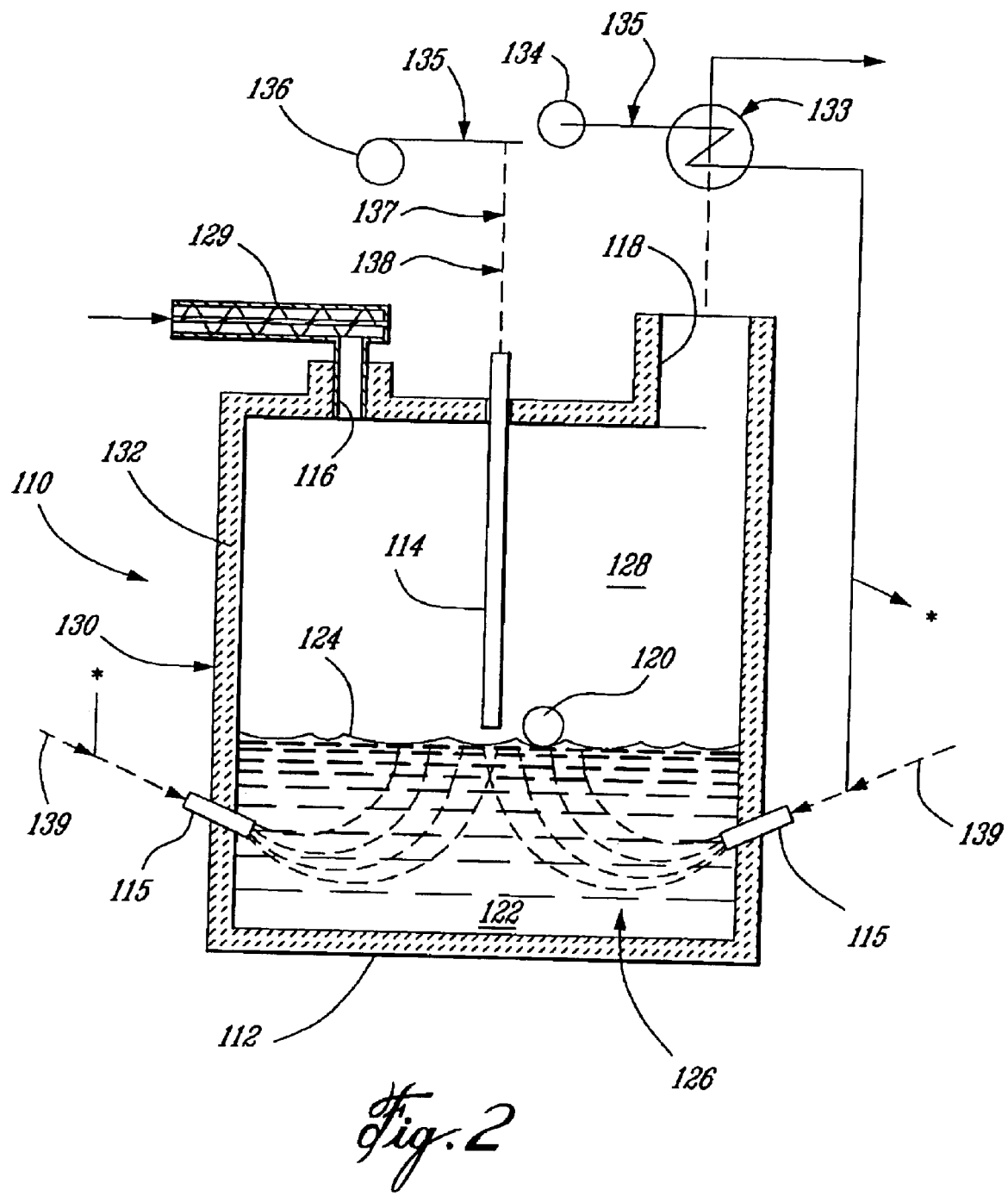
FIG. 2 illustrates schematically a furnace for carrying out the invention in a different embodiment.

FIG. 2 shows an alternative embodiment of reactor which has some of the features of FIG. 1. The furnace 110 has a housing 112, an inlet 116, an exhaust gas outlet 118 and a tapping outlet 120.

Furnace 110 has a lance 114 and tuyeres or pipes 115

A molten bath 122 having an upper bath surface 124 is formed in a lower region 126 of furnace 110. A zone 128 is defined above surface 124.

Furnace housing 112 has a furnace wall 130 and a refractory lining 132.

Typically furnace wall 130 is externally cooled by means (not shown).

The method employing furnace 110 is further described by reference to the preferred embodiment employing cement kiln dust and high carbon fly ash.

An initial charge of cement kiln dust and fly ash is introduced through inlet 116 via a feeder 129, for example a screw conveyor, into lower region 126 of furnace 110. The lance 114 which could be one or a plurality of lances, depending on the desired configuration and ultimate size of the unit, has a blower 136 providing a source of air. CKD at 137 and flyash at 138 are introduced into the lance 114 and jetted into the bath 122. The air may be oxygen enriched at point 135. Submerged tuyeres or pipes 115 inject air and/or oxygen beneath the surface 124. The tuyeres 115 may supplement the lance 114 or be employed in place of the lance 114. The option exists to pass the air from a blower 134 through a heat exchanger 133 to preheat the air or air oxygen mixture (oxygen if added entering at 135) before it enters the melt while simultaneously cooling the exhaust gases leaving the furnace.

A portion of the total oxygen required for the combustion and reaction process may come from the submerged tuyeres 115 and a proportion from the lance 114. It is also possible to design the entire operation without the lance 114 to jet into the melt, except that this is a useful feature to enable initial melting by injection of for example a gaseous fuel with air or oxygen enriched air. If the lance 114 is dispensed with for feeding then it is appropriate to inject the fuel-rich flyash, through point 139, into the melt through the tuyeres 115, but if there is insufficient carbon to meet the heat balance then coarser coal or other solid fuel may be fed into the vessel through the feeder 129 and inlet 116. The heat for melting the fresh charge is derived from the exothermic oxidation of the carbon in the fly ash by the oxygen in the oxygen gas or air.

The charges of fly ash and cement kiln dust are in proportions so that the melt produces a synthetic slag of calcium aluminosilicate.

The synthetic slag is discharged from outlet 120 and typically is subjected to pelletizing to produce pellets which may be employed as mineral aggregate or milled or ground to slag cement fineness.

Oxygen gas or air is injected to provide a stoichiometric excess for oxidation of the carbon content of the fly ash, to ensure that all of the carbon is oxidized.

In some circumstances premixing of the fly ash and cement kiln dust would be desirable in appropriate proportions for injection through lance 114 or through tuyeres 115.

It is also practical in certain instances for the total reactants to be fed through the feeder 129 and inlet 116 provided there is sufficient distribution of oxygen through the tuyeres 115 or through a lance 114 to enable combustion and distribution of the heat so generated around the melt.

Suffice it to say there are a number of options in the way the process might be implemented and the appropriate furnace designed. The examples given here are for descriptive purposes only. For those skilled in the art other possibilities will be evident using none, one or a number of nozzles, tuyeres or even porous plugs for injection of the oxygen gas. If one or more lances are used and whether these operate by entraining and injecting from above the melt or are submerged and the level of preheat or oxygen enrichment will be an economic choice for the furnace designer. The principles that should be observed are: sufficient excess oxygen for completion of the combustion reaction; appropriate ratio of the reactants to form the desired synthetic slag chemistry; and sufficient heating value in the flyash with or without the addition of supplementary fuel, coal or waste fuels to meet a heat balance at a high enough temperature. This temperature is predetermined to exceed the fusion point of the slag product and suitably with a sufficient excess temperature to permit a low viscosity of the slag for ease of mixing and discharge from the vessel.

Suitably the excess oxygen gas is more than 0% up to 50% with a preference for 5% to 15% on a stoichiometric basis.

What is claiemd is:

1. A method of producing a calcium aluminosilicate synthetic slag from a source of lime and coal ash comprising:
    a) melting an inorganic material providing a source of lime and a coal ash at a temperature of 1200° C. to 1650° C. and reacting lime and coal ash to form a molten calcium aluminosilicate synthetic slag,
    b) adding additional amounts of said inorganic material and said coal ash having a carbon content of 5 to 30% by weight to said molten slag,
    c) jetting an oxygen containing gas into said molten slat to anitate said molten slag and disperse the gas therein and oxidising the carbon content of said coal ash in said molten slat with said gas in an exothermic reaction with generation of heat and carbon dioxide and exploiting the generated heat in the melting and reacting of said additional amounts to produce a melt of molten calcium aluminosilicate synthetic slat and
    d) recovering said synthetic slaa from said melt, said inorganic material and coal ash being employed to provide a molar ratio of $SiO_2$ and $Al_2O_3$ to CaO of 1 to 2.5:1 to form said calcium aluminosilicate synthetic slag.

2. A method according to claim 1, wherein said inorganic material providing a source of lime is cement kiln dust.

3. A method according to claim 1, wherein said inorganic material providing a source of lime is selected from the group consisting of limestone, dolomite, calcined lime, calcite, calcium carbonate, quicklime, calcium hydroxide and combinations thereof.

4. A method according to claim 2, wherein said coal ash is fly ash.

5. A method according to claim 4, wherein said carbon content is 5 to 20%, by weight.

6. A method according to claim 4, wherein the heat generated by oxidising the carbon content of said fly ash in c) is the primary heat in said melting and reacting to produce said melt.

7. A method according to claim 6, wherein said melting and reacting is established in step a) with start-up heat and thereafter supply of said start-up heat is discontinued.

8. A method according to claim 6, further including adding waste carbonaceous material to said melt and oxidising said waste carbonaceous material to generate heat to supplement said primary heat in said melting and reacting.

9. A method according to claim 1, wherein step d) comprises pelletising said melt.

10. A method according to claim 9, wherein said pelletising comprises forming droplets of said melt and quenching said droplets while allowing the quenched droplets to expand and solidify.

11. A method according to claim 9, including grinding the thus produced pellets to a cement fineness.

12. A method according to claim 1, wherein said coal ash is bottom ash.

13. A method according to claim 1, including a step of adding steel slag to said melt.

14. A method of producing a cement from industrial inorganic byproducts comprising:
    a) melting and reacting a charge consisting essentially of cement kiln dust and fly ash in amounts to provide a molar ratio of $SiO_2$ and $Al_2O_3$ to CaO of 1 to 2.5:1, at a temperature of 1200° C. to 1650 ° C. to form molten calcium aluminosilicate slat;
    b) adding additional amounts of said cement kiln dust and fly ash having a carbon content of 3 to 30% by weight, based on the weight of fly ash, to said molten slag;
    c) jetting an oxygen containing gas into said molten slaR to agitate the molten slat and disperse the gas therein and oxidising the carbon content of said fly ash in said molten slag with said gas in an exothermic reaction with generation of heat and by-product carbon dioxide and exploiting the generated heat in the melting of said fresh additional amounts to produce melt of molten calcium aluminosilicate material, and
    d) recovering a calcium aluminosilicate cement from said enlarged melt.

15. A method according to claim 14, including a step of:
    e) removing hot combustion gases containing said by-oroduct carbon dioxide from said melt and recovering heat energy from said hot combustion gases.

16. A method according to claim 15, wherein said fly ash has a carbon content of 5 to 20%, by weight.

17. A method according to claim 14, wherein the heat generated by oxidising the carbon content of said fly ash in c) is the primary heat in said melting and reacting of said additional amounts to produce said melt.

18. A method according to claim 17, wherein said melting and reacting is established in step a) with start-up heat and thereafter supply of said start-up heat is discontinued.

19. A method according to claim 17, including adding waste carbonaceous material to said melt and oxidising said waste carbonaceous material to generate heat to supplement said primary heat in said melting and reacting.

20. A method according to claim 14, wherein step d) comprises forming droplets of said melt, quenching said droplets while allowing the quenched droplets to expand and solidifying and grinding the solidified, expanded droplets to a cement fineness.

21. A method according to claim 5, wherein said temperature is 1300° C. to 1450° C.

22. A method according to claim 14, wherein said temperature is 1300° C. to 1450° C.

* * * * *

UNITED STATES PATENT AND TRADEMARK OFFICE
CERTIFICATE OF CORRECTION

PATENT NO. : 6,755,905 B2
DATED : June 29, 2004
INVENTOR(S) : David B. Oates et al.

It is certified that error appears in the above-identified patent and that said Letters Patent is hereby corrected as shown below:

Column 9,
Line 4, "claiemd" should be -- claimed --.
Lines 9 and 10, after "C" delete ".".
Lines 15, 18 and 22, "slat" should be -- slag --.
Line 16, "anitate" should be -- agitate --.
Line 23, "slaa" should be -- slag --.

Column 10,
Line 12, 50 and 52, after "C" (all occurrences) delete ".".
Lines 13 and 18, "slat" should be -- slag --.
Line 17, "slaR" should be -- slag --.
Line 23, delete "fresh".
Line 26, delete "enlarged".
Line 29, "oroduct" should be -- product --.

Signed and Sealed this

Seventh Day of February, 2006

JON W. DUDAS
*Director of the United States Patent and Trademark Office*